Patented Dec. 9, 1930

1,783,986

UNITED STATES PATENT OFFICE

ALEXANDER STEWART, OF ROSELLE, NEW JERSEY, ASSIGNOR TO C. L. CONSTANT COMPANY, OF HOBOKEN, NEW JERSEY, A CORPORATION OF NEW JERSEY

PROCESS OF TREATING LEAD-BEARING MATERIAL

No Drawing. Application filed March 22, 1927. Serial No. 177,463.

The invention relates to the treatment of lead compounds or of mixtures of metallic lead and lead compounds, such as lead dross, oxides of lead, waste lead-battery paste, etc. It has for its object to convert such material to substantially chemically pure sulfate of lead.

As generally obtained, ordinary waste battery paste, as a specific material by way of example and to which the invention is particularly applicable, comprises principally lead peroxide ($PbO_2$), lead sulfate ($PbSO_4$) and small amounts of antimony, usually .5% to 3%. together with foreign organic matter such as wood and rubber, as well as small amounts of iron, arsenic, etc. This paste material may be obtained in any suitable manner from the scrap battery plates, the same being separated from said plates and then treated in bulk as hereinafter set forth. Or, other oxides of lead or mixtures of the lead and lead oxides obtained from different sources may be similarly treated for conversion into pure lead sulfate.

If the material to be treated comprises metallic lead and paste as, for example, in the case of lead-battery plates, the plate portion may be separated from the paste by any well known or special manner, for example, as set forth in the U. S. Letters Patent to Zuckermann No. 1,587,623. Thereupon the paste material may be converted to sulfate by fusion with an acid salt of an alkali metal as nitre cake, for example, as more particularly set forth in my U. S. Patent No. 1,610,899.

Or, the plate with grid may be fused as a whole with sodium chloride, as more particularly set forth in my United States Letters Patent No. 1,627,351, and whereby the oxides of the lead are converted substantially to lead chloride, the lead sulfate of the paste portion remaining as such, and the molten metallic lead being suitably removed therefrom. This mixture of chloride and sulfate is then to be fused with nitre cake or other suitable acid sulfate of an alkali metal to convert the mixture solely into sulfate plus any impurities present in the separated portion.

The sulfate thus obtained is to be purified as hereinafter set forth; but it has been found advantageous to obtain the sulfate from the grid material by a different process and whereby a very substantial portion of the impurities such as antimony and arsenic, etc., are removed in the early stage of the treatment so that the lead sulfate is more readily purified in the subsequent stages of the process.

For example, in the case of the paste material which consists substantially of lead peroxide and lead sulfate with the small amounts of impurities, the same is to be treated with a solution of sulfuric acid and any soluble chloride which will form a soluble sulfate. A most suitable chloride for this purpose, especially due to its low expense and ready availability, is sodium chloride or common salt. By this treatment of the paste material with the aforesaid solvent mixture, it has been found possible to complete the reaction of sulfuric acid on peroxide of lead and which reaction is only partially completed by the usual treatment solely with sulfuric acid. The reaction involved in the novel treatment is based upon the action of the chlorine of the chloride and one available oxygen from the peroxide of lead in an acid solution, for example,

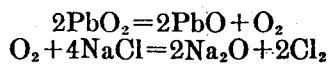

$$2PbO_2 = 2PbO + O_2$$
$$O_2 + 4NaCl = 2Na_2O + 2Cl_2$$

The treatment with the aforesaid solution, furthermore, involves a conversion into soluble sulfates of all other metals, such as tin, antimony, bismuth, zinc, copper, iron, arsenic, etc., and which are present in more or less percentages as impurities.

In carrying out this novel reaction, the following procedure has been found to give satisfactory results:

To one ton of, for example, dry, battery paste, there is added from 600–700 lbs. of salt and 100 gals. of water, the whole being thoroughly mixed; whereupon there is added slowly about 1,000 lbs. of sulfuric acid of a specific gravity of 1.84, while effecting a thorough agitation of the mass.

This mixture is then slowly heated with agitation of the mass until all of the lead peroxide, and any other oxides of the paste, have been converted to sulfate—probably according to the following reactions:

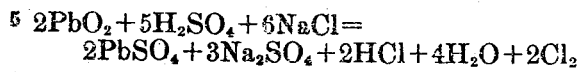
$$2PbO_2 + 5H_2SO_4 + 6NaCl = 2PbSO_4 + 3Na_2SO_4 + 2HCl + 4H_2O + 2Cl_2$$

or

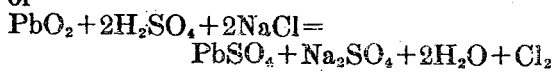
$$PbO_2 + 2H_2SO_4 + 2NaCl = PbSO_4 + Na_2SO_4 + 2H_2O + Cl_2$$

The temperature is thereupon increased until strong fumes of sulfuric anhydride ($SO_3$) are evolved.

By the heating process under these conditions, approximately 80–85% of the antimony and arsenic present as impurities in the original material are removed as volatile chlorides—$SbCl_3$ and $AsCl_3$.

After the entire mass has been allowed to cool, it is to be treated with a 20% solution of a sulfate or acid sulfate, for example, sodium sulfate or sodium acid sulfate, or other soluble sulfate of an alkali metal, which is added thereto. The mixture is then again heated and agitated, the liquid removed in any suitable manner as by decantation or filtering, and the residue washed free from impurities with water or water containing a small amount of dissolved nitre cake, the final washings being solely with water.

The resulting lead sulfate, which has thus been freed from the major portion of the impurities, or more or less impure lead sulfates otherwise obtained, may be brought to an extremely pure condition by the following treatment, to wit: subjecting the lead sulfate to treatment with a sulfuric acid solution containing sodium sulfate; or, sodium acid sulfate alone may be used, as well as solely sulfuric acid solution. In the latter instance, the necessary concentration of $SO_4$ ions may be obtained by the utilization of suitably concentrated sulfuric acid, the object being to prevent hydrolysis of base metals and keep the same in solution. The specific gravity of the acid, however, would necessarily be extremely high, approximately 1.41, and would render working therewith difficult as well as seriously attacking the utensils employed.

It is preferred, therefore, to make use of a comparatively weak sulfuric acid solution to which has been added sodium sulfate, or, as aforesaid, to use merely a sodium acid sulfate solution, or both. The acidity of these solutions should not be less than 2% free acid and the specific gravity thereof 1.124 when making use of the sodium acid sulfate; and not below 1.189 when using the sulfuric acid solution and sodium sulfate. With these comparatively weakly acid solutions, it is necessary, however, that the same be kept very hot as by passing steam therethrough.

When a solution is employed containing from 5–10% of free sulfuric acid with enough sodium sulfate or acid sulfate added thereto to bring the specific gravity up to 1.219, the solution merely needs to be warm, for example, having a temperature of approximately 50° C to 60° C.

Under the foregoing conditions, the antimony, tin, bismuth and other metals forming soluble sulfates will be removed from the sulfate of lead and will also be prevented from hydrolizing so that the same may be readily washed out from the lead sulfate which is recovered substantially in a chemically pure state. After removal of the sulfate solution, the residue is to be thoroughly washed with water and dried. It will be understood, of course, that the percentages of impurities present will more or less govern the specific gravities of the sulfuric acid and sulfate solutions; but it has been found that with impurities ranging from 0–3%, the minimum percentage of the free sulfuric acid is 2%, and that the specific gravity of the combined solutions should not be less than 1.124.

I claim:

1. The treatment of waste lead-battery paste which comprises thoroughly mixing one ton of the paste with a solution of 600–700 lbs. of sodium chloride in 100 gals. of water and adding thereto 1,000 lbs. of sulfuric acid of a specific gravity of 1.84.

2. The treatment of waste lead-battery paste which comprises thoroughly mixing one ton of the paste with a solution of 600–700 lbs. of sodium chloride in 100 gals. of water and adding thereto 1,000 lbs. of sulfuric acid of a specific gravity of 1.84, heating and agitating the mixture, then increasing the temperature thereof until strong fumes of sulfuric anhydride are evolved and until substantially all lead oxides have been converted to an insoluble sulfate, allowing the mixture to cool, treating the same with a 20% solution of a soluble sulfate of an alkali metal, again heating and agitating the mixture, removing the liquid, and washing the residue with water.

3. The treatment of waste lead-battery paste which comprises thoroughly mixing one ton of the paste with a solution of 600–700 lbs. of sodium chloride in 100 gals. of water and adding thereto 1,000 lbs. of sulfuric acid of a specific gravity of 1.84, heating and agitating the mixture, then increasing the temperature thereof until strong fumes of sulfuric anhydride are evolved and until substantially all lead oxides have been converted to an insoluble sulfate, allowing the mixture to cool, treating the same with a 20% solution of a soluble sulfate of an alkali metal, again heating and agitating the mixture, removing the liquid and washing the residue with water, then treating said residue with an acid sulfate solution of sufficient $SO_4$ ions to prevent hydrolysis of soluble sulfates, removing the liquid, and washing the residue with water.

4. The treatment of lead bearing material which comprises subjecting the same to a mixture of sulfuric acid and a soluble chloride capable of forming a soluble sulfate, and heating and agitating the mixture until substantially all lead oxides have been converted to an insoluble sulfate.

5. The treatment of lead bearing material which comprises subjecting the same to a mixture of sulfuric acid and a soluble chloride capable of forming a soluble sulfate, heating and agitating the mixture and then increasing the temperature until strong fumes of sulfuric anhydride are evolved and until substantially all lead oxides have been converted to an insoluble sulfate.

6. The treatment of lead bearing material which comprises subjecting the same to a mixture of sulfuric acid and a soluble chloride capable of forming a soluble sulfate, heating and agitating the mixture, then increasing the temperature until strong fumes of sulfuric anhydride are evolved and until substantially all lead oxides have been converted to an insoluble sulfate, cooling the mixture, treating the same with a solution of a soluble sulfate of an alkali metal, removing the liquid, and washing the residue free from impurities.

7. The process of refining lead sulfate containing antimony, which comprises treating the same with a weak solution of sulfuric acid to which a soluble sulfate of an alkali metal has been added to raise sufficiently the $SO_4$ ion concentration to prevent hydrolysis of soluble antimony sulfates.

8. The process of refining lead sulfate containing antimony, which comprises treating the same with a sulfate solution of free sulfuric acid content not substantially less than 2% and not substantially exceeding 10% and to which has been added a soluble sulfate to raise sufficiently the $SO_4$ ion concentration to prevent hydrolysis of antimony sulfate.

9. The process of refining lead sulfate containing antimony, which comprises treating the same with a solution containing substantially not less than 2% nor substantially more than 10% free sulfuric acid and an alkali metal sulfate in an amount to raise sufficiently the $SO_4$ ion concentrations to prevent hydrolysis of soluble sulfates.

10. The process of refining lead sulfate containing antimony, which comprises treating the same with a solution of a soluble sulfate of an alkali metal having a specific gravity of substantially not less than 1.124 and substantially not more than 1.219 and containing substantially not less than 2% nor substantially more than 10% of free sulfuric acid.

11. The process of refining lead sulfate containing antimony, which comprises treating the same with a solution of sodium acid sulfate, having a specific gravity of substantially 1.124 and containing substantially 2% of free sulfuric acid.

12. In the refining of antimonic lead sulfate in a weak sulfuric acid solution, the method of preventing hydrolysis of the antimony by maintaining the solution at a sufficiently high concentration of $SO_4$ ions by the addition of a soluble sulfate of an alkali metal thereto.

In testimony whereof I affix my signature.

ALEXANDER STEWART.